United States Patent
Qiu et al.

(10) Patent No.: US 10,215,640 B2
(45) Date of Patent: Feb. 26, 2019

(54) METHOD FOR PERFORMING COLOR MEASUREMENT USING STANDARD LIGHT SOURCE COLOR MATCHING OBSERVATION BOX

(71) Applicant: WENZHOUJIAYI INSTRUMENTS Co. Ltd., Wenzhou, Zhejiang Province (CN)

(72) Inventors: Jiayi Qiu, Wenzhou (CN); Changjun Li, Wenzhou (CN); Guolin Lei, Wenzhou (CN); Jianda Shi, Wenzhou (CN); Yingsheng Zhan, Wenzhou (CN)

(73) Assignee: WENZHOUJIAYI INSTRUMENTS CO., LTD (CN)

( * ) Notice: Subject to any disclaimer, the term of this patent is extended or adjusted under 35 U.S.C. 154(b) by 0 days.

(21) Appl. No.: 15/546,458

(22) PCT Filed: Apr. 15, 2016

(86) PCT No.: PCT/CN2016/079514
§ 371 (c)(1),
(2) Date: Jul. 26, 2017

(87) PCT Pub. No.: WO2017/147988
PCT Pub. Date: Sep. 8, 2017

(65) Prior Publication Data
US 2018/0120162 A1     May 3, 2018

(30) Foreign Application Priority Data
Mar. 4, 2016   (CN) .......................... 2016 1 0123689

(51) Int. Cl.
*G01J 3/46*     (2006.01)
*G01J 3/10*     (2006.01)
(Continued)

(52) U.S. Cl.
CPC ................. *G01J 3/463* (2013.01); *G01J 3/10* (2013.01); *G01J 3/50* (2013.01); *G01J 3/501* (2013.01);
(Continued)

(58) Field of Classification Search
CPC ........ G01J 3/463; G01J 3/10; G01J 3/524501; G01J 1/42
See application file for complete search history.

(56) References Cited

U.S. PATENT DOCUMENTS

| | | | | |
|---|---|---|---|---|
| 4,812,904 A | * | 3/1989 | Maring | G01J 3/10 348/135 |
| 5,803,579 A | * | 9/1998 | Turnbull | B60L 1/14 257/E25.02 |

(Continued)

*Primary Examiner* — Maurice Smith
(74) *Attorney, Agent, or Firm* — PROI Intellectual Property US

(57) ABSTRACT

The present invention discloses a method for performing color measurement using a standard light source color matching observation box. The method comprises: arranging a halogen tungsten lamp and a light filter in the color matching observation box for cooperation, wherein the light ray of the halogen tungsten lamp emits a main body radiation light ray through the light filter; arranging a plurality of narrow-wave LED light sources of different light-emitting wavelengths to emit a compensation light ray; mixing the main body radiation light ray and the compensation light ray in the color matching observation box into a mixed light ray that uniformly simulates a standard D illuminant; and performing a color measurement on a measured object in the color matching observation box by the mixed light ray.

8 Claims, 7 Drawing Sheets

(51) Int. Cl.
    *G01J 3/50* (2006.01)
    *G01J 3/51* (2006.01)
    *G01J 3/52* (2006.01)
(52) U.S. Cl.
    CPC ............... *G01J 3/51* (2013.01); *G01J 3/524* (2013.01); *G01J 2003/102* (2013.01)

(56) References Cited

U.S. PATENT DOCUMENTS

| | | | | |
|---|---|---|---|---|
| 2003/0095138 A1* | 5/2003 | Kim | ............. | G06T 11/001 345/690 |
| 2007/0133867 A1* | 6/2007 | Park | ............. | H04N 1/6027 382/162 |
| 2008/0232848 A1* | 9/2008 | Proper | ............. | G03G 9/0806 399/154 |
| 2012/0194816 A1* | 8/2012 | Hempson | ............. | H05B 41/2806 356/326 |
| 2013/0020929 A1* | 1/2013 | van de Ven | ............. | H01L 25/0753 313/498 |
| 2013/0322750 A1* | 12/2013 | Agarwal | ............. | G06K 9/4652 382/165 |

* cited by examiner

METHOD FOR PERFORMING COLOR MEASUREMENT USING STANDARD LIGHT SOURCE COLOR MATCHING OBSERVATION BOX

CROSS REFERENCE TO RELATED APPLICATIONS

The present application is the US national stage of International Patent Application PCT/CN2016/079514 filed on Apr. 15, 2016, which, in turn, claims priority to Chinese Patent Application CN 201610123689.6 filed on Mar. 4, 2016.

TECHNICAL FIELD

The present invention relates to a measuring method, and more particularly to a method for performing color measurement using a standard light source color matching observation box.

BACKGROUND ART

The light source of the daylight of a standard D illuminant for a standard light source color matching observation box or light box in the current market includes a variety of brands of fluorescent tubes and uses a halogen tungsten lamp to pass through the light filter so that the radiated light ray simulates a D illuminant specified by the CIE standard. The relative spectral power distribution of the radiated light source passing through the light filter with the halogen tungsten lamp can reach A level of the metamerism index of the D illuminant specified by the CIE standard. However, due to the influence of the material and the manufacturing process technology, it is difficult for the technical indicator of the relative spectral power distribution of its function for irradiating the light source to achieve the A-level metamerism index quality level <0.2 of the CIE D-standard illuminant. In the course of the using for a long time, it will gradually deteriorate, and even exceed the metamerism index of 0.25, with only B level of >0.25~0.50 level. As the halogen tungsten lamps of the same specification have a difference in material composition, the relative spectral power distribution of the light emitted therefrom cannot have a stable quality. The configured light filter of colored optical glass will vary with the relative spectral power distribution of the permeable radiated light because of material. The combination of a light filter and a halogen tungsten lamp can only form a CIE standard D illuminant of a single specification. The CIE standard illuminant includes D65, D75, D55, D50 and other standards. The prior art makes it difficult to ensure that the standard light source continues to have a stable spectral power distribution after prolonged use, and the replacement of the halogen tungsten lamp or the light filter will produce a difference, thus affecting the accuracy of the test.

It is difficult for the spectral power distribution of the light ray of the halogen tungsten lamp through the light filter to solve the zigzag shape of different wavelengths, so the light source quality of SpectraLightQC standard light source color matching observation box (new products put into market only in 2013) which is considered to have the highest quality in the current market can only reach A or B level of 0.20-0.30 according to the metamerism index of the light source of the quality indicator specified by CIE15: 2004. The halogen tungsten lamp tube used by such standard D daylight source causes the relative spectral power distribution of the light source to vary since the used tungsten wire and the inert gas containing halide and halogen elements has a gradual change in efficiency in the process of using the lamp tube for a long time and the material (chemical material) of the colored optical glass for the light filter varies. Therefore, in the course of use, the metamerism index of the light source gradually increases from 0.21 to 0.25-0.30, and can only be maintained at the B level. Although the illumination is still high, the luminous area formed by winding tungsten wires in the lamp tube has a difference in distances of different lengths, and the illumination energy emitted therefrom will be different, so the illumination uniformity for the position storing objects in the light source box can only reach about 90% of the quality level.

In recent years, due to LED light source has the advantages such as saving power, high luminous efficiency and long life, etc., a number of light source research units have introduced the use of an LED to simulate the CIE standard D light source. Since the spectral distribution of the light ray emitted by the LED can only be in the narrow-wavelength band, and the main peak of the spectrum emitted by each LED is narrowed into spikes, although the light rays of three narrow-waves of red, green and blue can form an integrity to emit white light, its spectral power distribution has defects. So a multi-stage narrow-band LED is used to combine to emit light to illuminate the spectral power distribution close to the specification requirements of the D illuminant specified by the CIE standard, but the relative spectral power distribution of the light ray that it illuminates the position in which objects are stored in the standard light source color matching observation box is non-uniform. Recently an LED-based intelligent color matching light box is introduced, using the method of using at least with an LED white light source and a plurality of single-color LEDs as the illuminant. A halogen tungsten lamp is used to configure a special light filter to emit light to supplement the radiant energy of the overall visible light. The use of electronic technology to monitor the intelligent adjustment of the energy of the light ray emitted by each LED light. Although the combination of light ray emitted therefrom can simulate the color temperature index of the CIE standard D illuminant, the main peak energy of the spectrum of the light ray emitted by a variety of LEDs, and the relative spectral power distribution parameters of the light ray emitted therefrom cannot reach the index of each band specified by the CIE standard. It is clear that the difference is very obvious only if the measured data for analyzing the relative spectral power distribution of the emitted light ray and the relative spectral power distribution parameter of the D illuminator specified by the CIE standard are compared. Although the current general color temperature measuring instrument is used to measure its color temperature value so as to achieve the D light source indicators specified by the CIE standard, it is very difficult for the metamerism index of the light source emitted therefrom to reach A level. This uses a plurality of single-color LEDs to configure a white light LED as the main body of the light source radiation energy, but the light ray transmitted in such a way that a tungsten lamp configures a light filter is used as a supplement of the radiation energy. It is still very difficult for the radiation uniformity to have a good uniformity on the surface of the sample to be measured.

SUMMARY

It is an object of the present invention to overcome the shortcomings of the prior art and to provide a method for performing color measurement using a standard light source color matching observation box, which allows the relative spectral power distribution of the standard light source to reach A level of the metamerism index specified by the CIE standard and ensures test accuracy and device durability.

The present invention adopts the following technical solution: a method for performing color measurement using a standard light source color matching observation box, wherein a halogen tungsten lamp and a light filter are arranged in the color matching observation box for cooperation, the light ray of the halogen tungsten lamp emits a main body radiation light ray through the light filter; a plurality of narrow-wave LED light sources of different light-emitting wavelengths are arranged to emit a compensation light ray; the main body radiation light ray and the compensation light ray are mixed in the color matching observation box into a mixed light ray that uniformly simulates a standard D illuminant; and the mixed light ray performs a color measurement on a measured object in the color matching observation box.

As an improvement, when the tungsten halogen tungsten lamp and the narrow-wave LED light source are in operation, the tungsten halogen tungsten lamp is an illumination main body which provides main illumination energy, and the illumination energy of the narrow-wave LED light source occupies 20% or less of the total radiation energy.

As an improvement, a UV ultraviolet lamp is arranged in the color matching observation box, which compensates for UV energy when working together with the halogen tungsten lamp and the narrow-wave LED light source.

As an improvement, the tube of the halogen tungsten lamp is a quartz tube with a transparent surface, and the surface of the quartz tube uses a sandblasting process so as to become a diffusion-scattering light transmitting body.

As an improvement, the color matching observation box adjusts the brightness of the narrow-wave LED light sources of different light-emitting wavelengths by measuring a change in color temperature data during the color measurement, so that the color temperature data of the mixed light ray meets the requirement.

As an improvement, the color matching observation box is calibrated before leaving the factory by the following steps:
[1] measuring the spectral power distribution curve of the main body radiation light ray by the externally connected spectrum analyzer;
[2] comparing the spectral power distribution curve measured in [1] with the relative spectral power distribution curve of a CIE standard D illuminant, and initially adjusting the brightness of each narrow-wave LED light source;
[3] measuring the color temperature data and the metamerism index data of the mixed light ray by an externally connected spectrum analyzer;
[4] determining whether the color temperature data and the metamerism index data measured in [3] meet the requirement;
[5] finely adjusting the brightness of each narrow-wave LED light source and repeating steps [3], [4], and [5] when the color temperature data or the metamerism index data does not meet the requirement; and completing the calibration and saving the calibration data when the color temperature data and the metamerism index data meet the requirement at the same time.

As an improvement, the color matching observation box is calibrated before leaving the factory: that is, sampling the color temperature data by the externally connected spectrum analyzer, sampling the RGB data by a color sensor arranged in the color matching observation box, calculating a matrix coefficient between the RGB data and the color temperature data, and sending the matrix coefficient to a main control module of the color matching observation box to be saved; and obtaining the color temperature data by calculating the RGB data and the matrix coefficient sampled by the color sensor after the color matching observation box leaves the factory.

As an improvement, the RGB is converted to XYZ by a polynomial regression algorithm with the formula:

$$\begin{bmatrix} R \\ G \\ B \end{bmatrix} \bullet M = \begin{bmatrix} X \\ Y \\ Z \end{bmatrix} \quad (1)$$

where R is a red light signal, G is a green light signal, B is a blue light signal, X, Y, and Z are the spectral tristimulus values, let the matrix $$\begin{bmatrix} R \\ G \\ B \end{bmatrix} = I, \begin{bmatrix} X \\ Y \\ Z \end{bmatrix} = H,$$

that is, the formula (1) may be expressed as H=IM, M is the matrix coefficient to be solved, the conversion matrix M may be solved by the following formula based on the least square method:

$$M=(I^T I)^{-1} I^T H \quad (2)$$

where $I^T$ represents the transposition of I;
the XYZ converting color temperature is calculated by the following formulas:

$$CCT=449V^3+3525V^2+6823.3V+5520.33 \quad (3)$$

$$V=(x-0.3320)/(0.1858-y) \quad (4)$$

$$x=X/(X+Y+Z) \quad (5)$$

$$y=Y/(X+Y+Z) \quad (6)$$

where CCT is the color temperature, and V, x, and y are intermediate variables.

As an improvement, the color collection is performed by arranging a light source above the color matching observation box to be matched with the upper digital camera;
the image color data of a standard color card under the light source in the color matching observation box is collected through the digital camera, the image color data is combined with the XYZ spectral tristimulus value of the standard color card to obtain the conversion relationship therebetween; and
the image color data of a standard sample and a batch sample under the light source in the color matching observation box is measured using the digital camera, the XYZ spectral tristimulus value of the standard sample and the batch sample is calculated by the conversion relationship obtained by the standard color card, the relevant chromatic aberration is calculated based on the XYZ spectral tristimulus value thereof, and it is determined whether the color meets the requirement according to the requirement of the quality of the measured object.

As an improvement, the conversion relationship from the image color data to the XYZ spectral tristimulus value is calculated as follows:

obtaining the image color data of N color blocks on the standard color card, obtaining the XYZ spectral tristimulus value of N color cards on the standard color card, establishing a polynomial regression model therebetween, and calculating the conversion matrix therebetween; wherein the polynomial regression model is as follows:

$$\begin{bmatrix} R \\ G \\ B \end{bmatrix} \bullet M = \begin{bmatrix} X \\ Y \\ Z \end{bmatrix}$$

where R is a red light signal, G is a green light signal, B is a blue light signal, X, Y, and Z are the spectral tristimulus values, let the matrix $$\begin{bmatrix} R \\ G \\ B \end{bmatrix} = I, \begin{bmatrix} X \\ Y \\ Z \end{bmatrix} = H,$$

that is, the formula (1) may be expressed as H=IM, M is the matrix coefficient to be solved, the conversion matrix M may be solved by the following formula based on the least square method:

$$M = (I^T I)^{-1} I^T H \qquad (2)$$

where $I^T$ represents the transposition of I.

As an improvement, the digital camera may be arranged in the middle of the upper part of the color matching observation box or at the opening on the side surface of the upper part of the color matching observation box; when the digital camera is arranged in the middle of the upper part of the color matching observation box, the measured object is placed directly on the bottom plate of the color matching observation box; when the digital camera is arranged at the opening on the side surface of the upper part of the color matching observation box, the digital camera and the bottom plate form an included angle of 45 degrees, a substrate directly facing the digital camera is arranged on the bottom plate, the substrate and the bottom plate form an included angle of 45 degrees, and the measured object is placed on the substrate.

The present invention has the advantages that the combination of a halogen tungsten lamp and a narrow-wave LED light source can simulate D illuminators of different specifications, that is, D65, D75, D55, D50, etc., and it can be achieved by adjusting the brightness of the narrow-wave LED light source; after using a narrow-wave LED light source of a different light-emitting wavelength for compensation, the quality of the light source is <0.2 A level according to the metamerism index specified by D illuminant of the CIE standard, which is difficult to achieve by the original use of a halogen tungsten lamp plus a light filter; the stability of the light source is improved, so that the change of the color temperature does not occur during the use of the light source, and the compensation light ray is adjusted by the automatic monitoring so that the relative spectral power distribution of the irradiated light source is compliant with the standard, to ensure the accuracy of the result of a long-time color measurement. The light ray emitted by the halogen tungsten lamp is used as the main body radiation light ray, which may have a more gentle spectral power distribution curve. The lack of energy of the halogen tungsten lamp through the light filter is compensated for by the low-power narrow-wave LED light source, which can be simulated into high-precision D illuminator of the CIE standard.

In the diagrams: 1: halogen tungsten lamp; 2: light filter; 3: narrow-wave LED light source; 4: incandescent lamp; 5: sunset lamp; 6: fluorescent lamp; 7: UV ultraviolet light; 8: substrate; 9: the bottom plate; and 10: digital camera.

DETAILED DESCRIPTION

Hereinafter, specific embodiments of the present invention will be described in detail with reference to the accompanying drawings.

Figure 1:
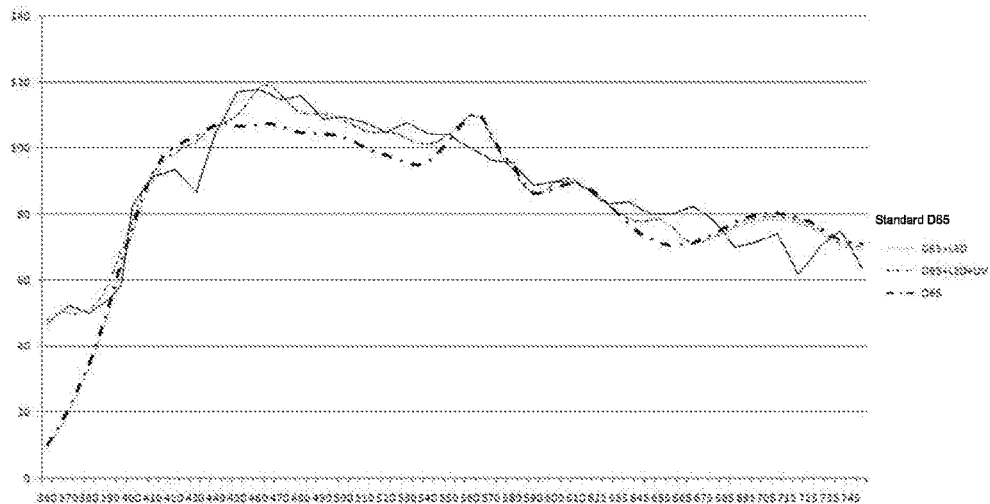
FIG. 1 is a comparison view of the spectral power distribution curve standards D65, D65, D65+LED, D65+LED+UV according to the present invention.
Figure 2:
FIG. 2 is a comparison view of the spectral power distribution curve standards D65 and D65 according to the present invention.
Figure 3:
FIG. 3 is a comparison view of the spectral power distribution curve standards D65, D65, D65+LED according to the present invention.
Figure 4:
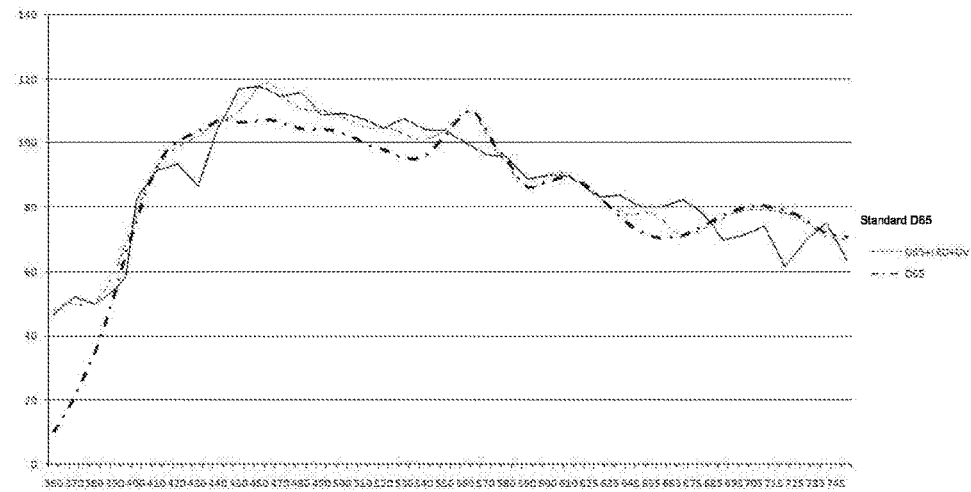
FIG. 4 is a comparison view of the spectral power distribution curve standards D65, D65, D65+LED+UV according to the present invention.
Figure 5:
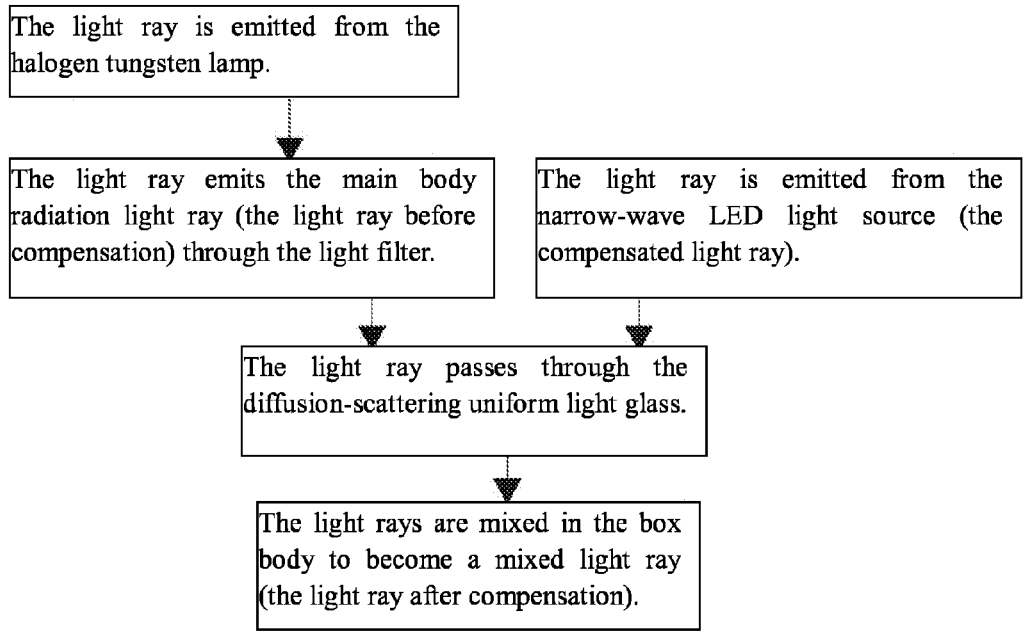
FIG. 5 is a schematic diagram of the structure according to the present invention.

As shown in FIGS. 1, 2, 3, 4, 5, 6, 7, 8, 9, and 10, a specific embodiment of the method for performing color measurement using a standard light source color matching observation box according to the present invention is shown. In the embodiment, a halogen tungsten lamp 1 and a light filter 2 are arranged in the color matching observation box for cooperation, the light ray of the halogen tungsten lamp 1 emits a main body radiation light ray through the light filter 2; a plurality of narrow-wave LED light sources 3 of different light-emitting wavelengths are arranged to emit a compensation light ray; the main body radiation light ray and the compensation light ray are mixed in the color matching observation box into a mixed light ray that uniformly simulates a standard D illuminant; and the mixed light ray performs a color measurement on a measured object in the color matching observation box. The daylight source is an important light source for measuring the color, but the manner in which the existing halogen tungsten lamp 1 plus the light filter 2 simulates the daylight source will still produce a change in the relative spectral power distribution of the light source after a period of use, resulting in the fact that color measuring error occurs and is increasing; and one halogen tungsten lamp 1 configured with the light filter can only simulate a standard D illuminator, and the spectral power distributions between the halogen tungsten lamps 1 are not the same, and the replacement will result in an error. FIG. 5 is a schematic diagram. An adjustable narrow-wave LED light source 3 is provided to be matched with the halogen tungsten lamp 1 configured with the light filter so that the light ray of them can be mixed and compensated for as a D illuminant light source compliant with the standard for measuring; the narrow-wave LED light source 3 has narrow band range of 350 nm-850 nm. The brightness of the narrow-wave LED light source 3 is adjusted to simulate CIE standard D illuminators of different specifications D65, D75, D55, D50, etc.; after used for a period of time, if it is found after measuring that the mixed light source does not meet the standard, it can be compensated by debugging the narrow-wave LED light source 3, so that the relative spectral power distribution of the compensated mixed light source re-conforms to the CIE standard, and the halogen tungsten lamp 1 has a uniform emergent ray energy to improve the accuracy of performing color measurement on the measured object by the standard light source color matching observation box. As shown in FIGS. 1, 2 and 3, the simulated D65 light emitted from the halogen tungsten lamp 1 through the light filter 2 is used as the main body radiation light ray, which may have a more gentle spectral power distribution curve. The lack of energy of the halogen tungsten lamp 1 through the light filter 2 is compensated for by the low-power narrow-wave LED light source 3, which can be simulated into high-precision D65 of the CIE standard. The metamerism index of its light source can reach A level in the range of 0.10-0.18, and its color rendering index can be more than 97.5 quality indicators.

As an improved specific embodiment, when the tungsten halogen tungsten lamp 1 and the narrow-wave LED light source 3 are in operation, the tungsten halogen tungsten lamp 1 is an illumination main body which provides main illumination energy, and the illumination energy of the narrow-wave LED light source 3 occupies 20% or less of the total radiation energy. In the use, the narrow-wave LED light source 3 uses less power, occupies less illumination energy, and ensures that the spectral power distribution curve is gentle while performing light ray compensation well, and the simulated curve is closer to the CIE standard curve.

As an improved specific embodiment, a UV ultraviolet lamp 7 is arranged in the color matching observation box, which compensates for UV energy when working together with the halogen tungsten lamp 1 and the narrow-wave LED light source 3. As shown in FIGS. 1, 2, 3 and 4, for the light ray of the halogen tungsten lamp 1 after passing through the light filter 2, its 360-090 nm near-ultraviolet spectrum energy can only reach about 20% of the energy specified by the CIE standard D illuminator. The UV ultraviolet lamp 7 of the main wavelength of 365 nm is configured in the standard light source, and the energy of the UV ultraviolet lamp 7 is calibrated before leaving the factory so as to supplement the energy of the light source of the halogen tungsten lamp 1. When being turned on with the halogen tungsten lamp 1 and the narrow-wave LED light source 3 at the same time to work, the UV ultraviolet lamp 7 can simulate the relative spectral power distribution curve of the more standard D illuminant, so that the measurement result is more accurate.

As an improved specific embodiment, the tube of the halogen tungsten lamp 1 is a quartz tube with a transparent surface, and the surface of the quartz tube uses a sandblasting process so as to become a diffusion-scattering light transmitting body. Tungsten wires have a particular length, the distance in which it is wound and shaped will have more or less difference, so the light emitted by the whole halogen tungsten lamp 1 in the position of different lengths will also have difference in strength; after a sandblasting layer is provided on the surface of the tube, the tube is made into a diffusion-scattering glass structure. The light ray will be reflected in each light emitting segment in the tube of the halogen tungsten lamp 1, and the light emitted finally has a better uniformity.

Figure 6:
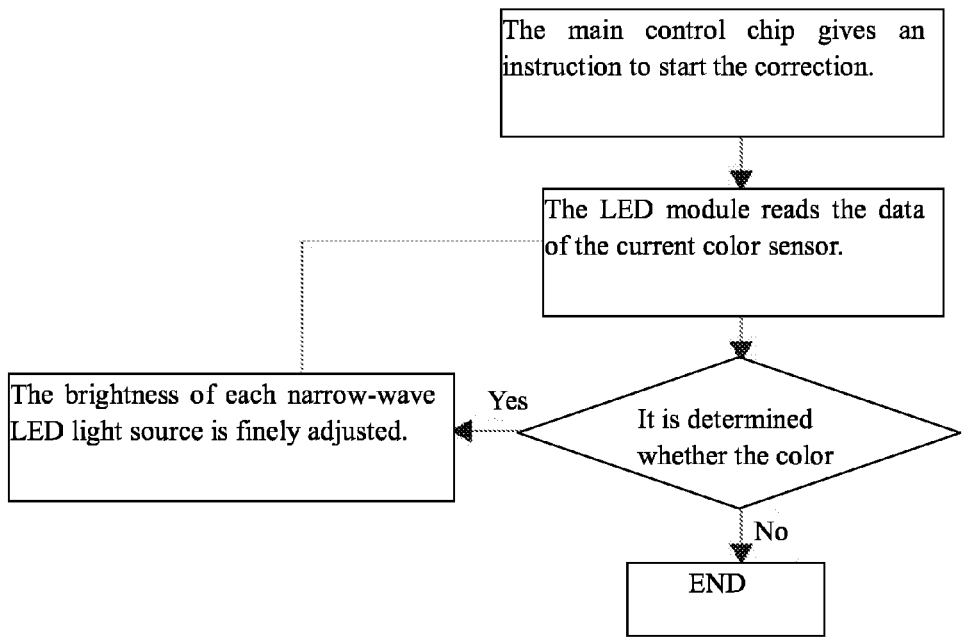
FIG. 6 is a flow diagram of color temperature adjustment after leaving the factory according to the present invention.

As an improved specific embodiment, the color matching observation box adjusts the brightness of the narrow-wave LED light sources 3 of different light-emitting wavelengths by measuring a change in color temperature data during the color measurement, so that the color temperature data of the mixed light ray meets the requirement. As shown in FIG. 6, a color sensor is arranged in the color matching observation box to measure the change of the color temperature. An instruction to adjust the brightness of the narrow-wave LED light source 3 is given according to the law that the light source changes relative to the spectral power distribution in the change of the color temperature, and the adjustment is ended when the color temperature data satisfies the requirement, thus ensuring the test accuracy when the halogen light 1 and the narrow-wave LED light source 3 cooperate as a standard light source.

As an improved specific embodiment, the color matching observation box is calibrated before leaving the factory by the following steps:

[1] measuring the spectral power distribution curve of the main body radiation light ray by the externally connected spectrum analyzer;
[2] comparing the spectral power distribution curve measured in [1] with the relative spectral power distribution curve of a CIE standard D illuminant, and initially adjusting the brightness of each narrow-wave LED light source;
[3] measuring the color temperature data and the metamerism index data of the mixed light ray by an externally connected spectrum analyzer;
[4] determining whether the color temperature data and the metamerism index data measured in [3] meet the requirement;
[5] finely adjusting the brightness of each narrow-wave LED light source and repeating steps [3], [4], and [5] when the color temperature data or the metamerism index data does not meet the requirement; and completing the calibration when the color temperature data and the metamerism index data meet the requirement at the same time.

Figure 7:
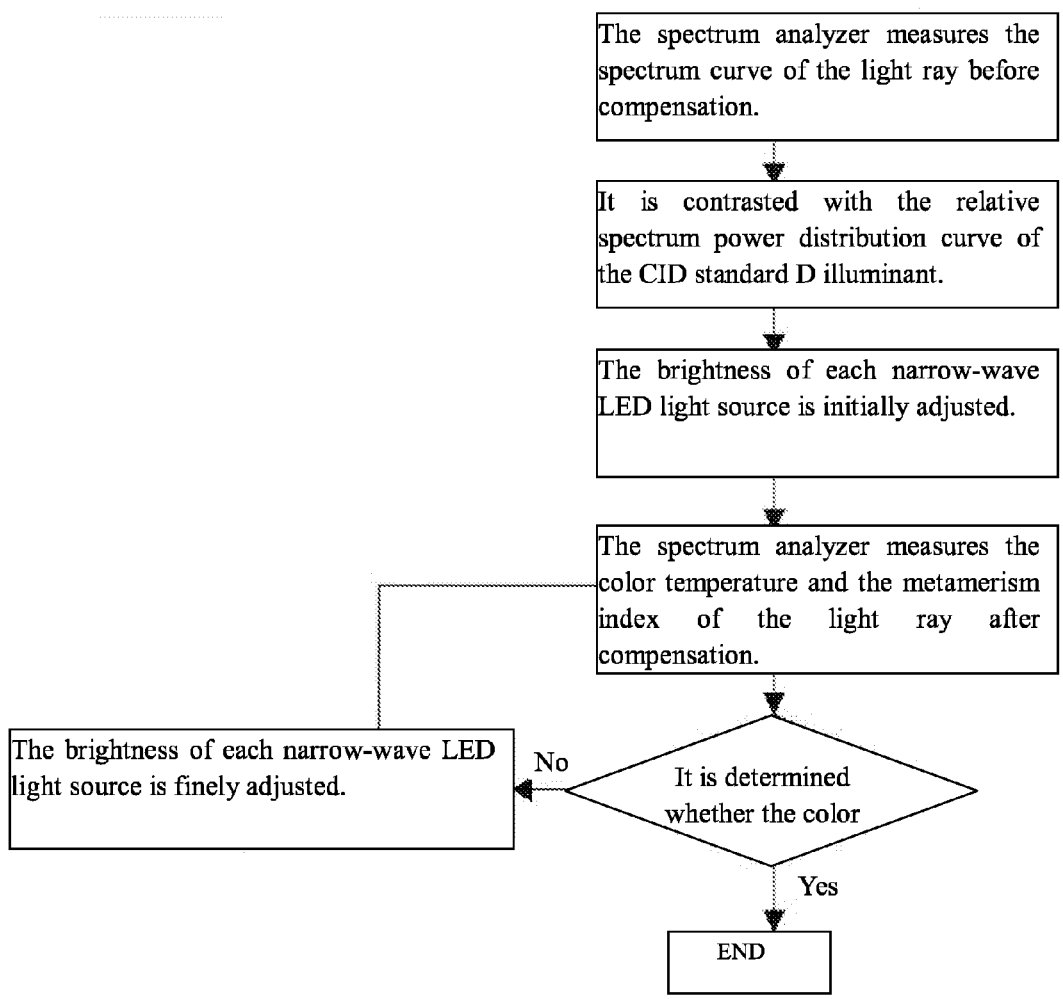
FIG. 7 is a flow diagram of narrow-wave LED light source adjustment before leaving the factory according to the present invention.
Figure 8:
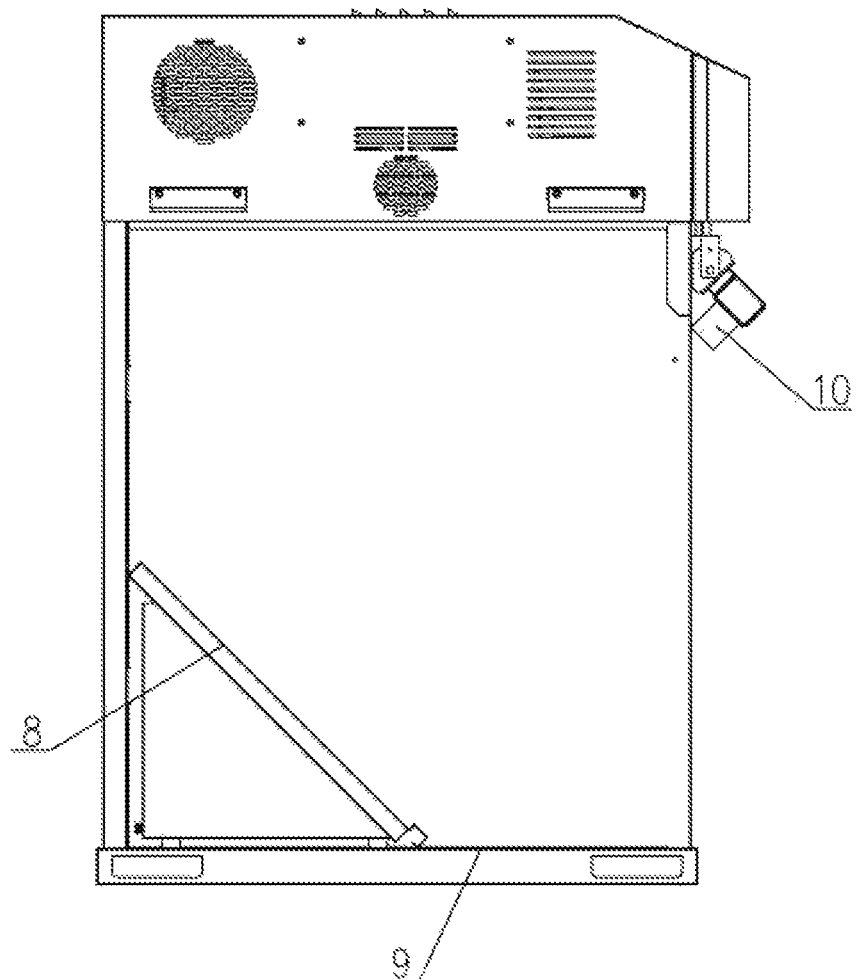
FIG. 8 is a first side cross-sectional view of a standard light source color matching observation box according to the present invention.
Figure 9:
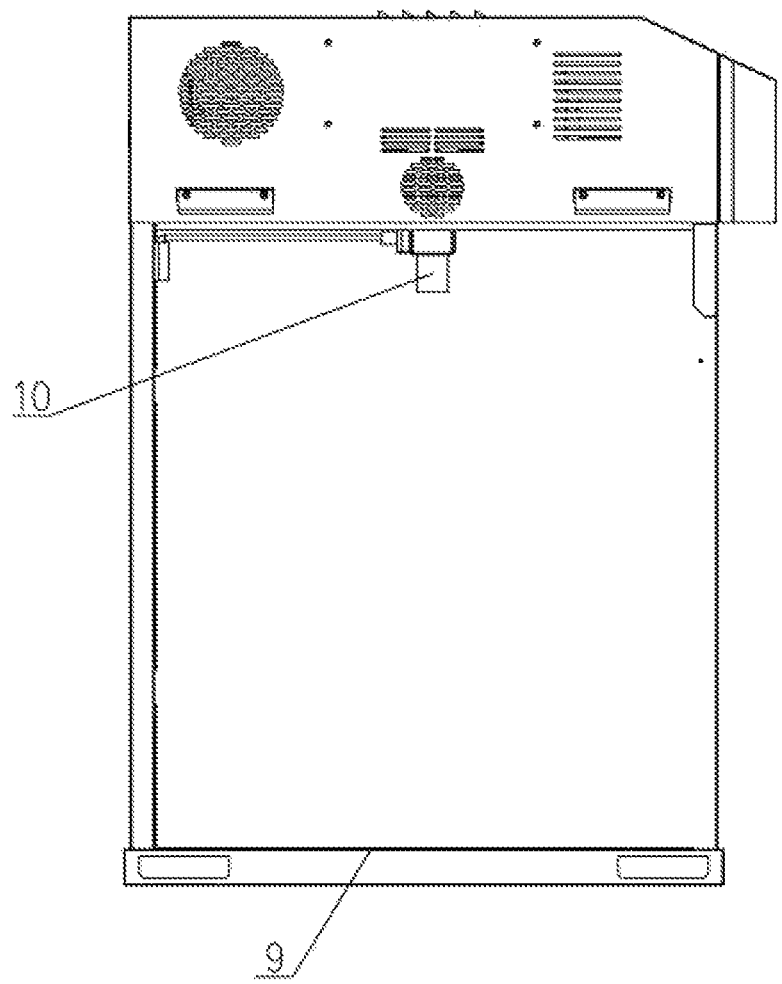
FIG. 9 is a second side cross-sectional view of a standard light source color matching observation box according to the present invention.
Figure 10:
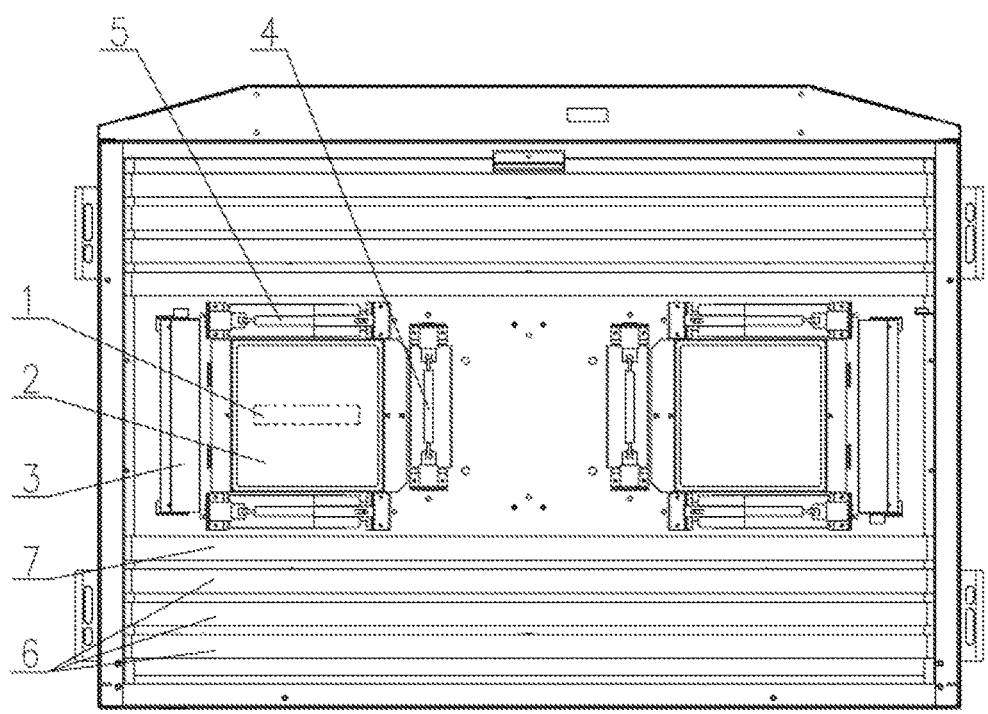
FIG. 10 is an internal bottom view of a standard light source color matching observation box according to the present invention.

As shown in FIG. 7, the detection of the color temperature and the metamerism index performed by the spectral analyzer before leaving the factory is shown, so as to adjust the brightness of the narrow-wave LED light source 3, so that the brightness of each narrow LED light source 3 meets the standard requirement when leaving the factory. The compensated light emitted by the halogen tungsten lamp 1 and the narrow-wave LED light source 3 meets the metamerism index <0.2 A level specified by the CIE standard D illuminator when leaving the factory. The result obtained in the color measurement is more accurate; the real-time adjustment of the narrow-wave LED light source 3 is performed in combination with the process shown in FIG. 6 in the use.

As an improved specific embodiment, the color matching observation box is calibrated before leaving the factory: that is, sampling the color temperature data by the externally connected spectrum analyzer, sampling the RGB data by a color sensor arranged in the color matching observation box, calculating a matrix coefficient between the RGB data and the color temperature data, and sending the matrix coefficient to a main control module of the color matching observation box to be saved; and obtaining the color temperature data by calculating the RGB data and the matrix coefficient sampled by the color sensor after the color matching observation box leaves the factory. The spectral analyzer is more expensive, bulky, and strict in requirements on the ambient temperature. In consideration of all aspects, the spectral analyzer is not suitable to be arranged in the color matching observation box. However, the spectral analyzer must be used in order to carry out an accurate measurement of the color temperature and the metamerism index. It is difficult to determine whether the initial state of the standard light source is compliant with the test standard without the color temperature and metamerism index data. Alternatively, the spectrum of the standard light source changes after the using time increases, so as to affect the accuracy of the test. A color sensor is arranged in the color matching observation box to replace a spectral analyzer, greatly reducing the measuring cost. The light source of each color matching observation box uses the spectral analyzer for color temperature data measurement before leaving the factory, and performs RGB data measurement together with the color sensor. The matrix coefficient for establishing two groups of data is saved in the main control module of the color matching observation box. After leaving the factory, the color matching observation box can obtain the color temperature data by calculating the RGB data and the matrix coefficient measured by the color sensor, so that the light source status is monitored in real time so as to facilitate calibration.

As an improved specific embodiment, the RGB is converted to XYZ by a polynomial regression algorithm with the formula:

$$\begin{bmatrix} R \\ G \\ B \end{bmatrix} \bullet M = \begin{bmatrix} X \\ Y \\ Z \end{bmatrix} \quad (1)$$

where R is a red light signal, G is a green light signal, B is a blue light signal, X, Y, and Z are the spectral tristimulus values, let the matrix $$\begin{bmatrix} R \\ G \\ B \end{bmatrix} = I, \begin{bmatrix} X \\ Y \\ Z \end{bmatrix} = H,$$

the RGB signal obtained by the color sensor in N states of the light source is denoted as I, the light source XYZ signal obtained by the spectrum analyzer in the corresponding N states is denoted as matrix H, that is, the formula (1) may be expressed as H=IM, M is the matrix coefficient to be solved, the conversion matrix M may be solved by the following formula based on the least square method:

$$M=(I^T I)^{-1} I^T H \quad (2)$$

where $I^T$ represents the transposition of I; −1 denotes matrix inversion. The optimum conversion should minimize the predicted chromatic aberration of all color blocks, and M obtained from the above formula minimizes the mean square error between the predicted model XYZ value in the respective states of the light source and the corresponding XYZ measuring value. By the obtained matrix coefficient, the RGB obtained by the color sensor can be converted into the XYZ tristimulus value.

The XYZ converting color temperature is calculated by the following formulas:

$$CCT=449V^3+3525V^2+6823.3V+5520.33 \quad (3)$$

$$V=(x-0.3320)/(0.1858-y) \quad (4)$$

$$x=X/(X+Y+Z) \quad (5)$$

$$y=Y/(X+Y+Z) \quad (6)$$

where CCT is the color temperature, and V, x, and y are intermediate variables. By the calculation with the above formulas, the RGB data measured by the color sensor can be converted into color temperature data so as to know the state of the light source, facilitating the calibration and adjustment of the main control module and the host computer of the color matching observation box, ensuring the standardization of the light source, and ensuring the accuracy of the color measurement; and the cost is lowered and it is conducive to universal use.

As an improved specific embodiment, the color collection is performed by arranging a light source above the color matching observation box to be matched with the upper digital camera 10; the image color data of a standard color card under the light source in the color matching observation box is collected through the digital camera 10, the image color data is combined with the XYZ spectral tristimulus value of the standard color card to obtain the conversion relationship therebetween; and the image color data of a standard sample and a batch sample under the light source in the color matching observation box is measured using the digital camera 10, the XYZ spectral tristimulus value of the standard sample and the batch sample is calculated by the conversion relationship obtained by the standard color card, the relevant chromatic aberration is calculated based on the XYZ spectral tristimulus value thereof, and it is determined whether the color meets the requirement according to the requirement of the quality of the measured object.

Traditionally, the naked eyes of those skilled in the art compares the difference therebetween, and makes a judgment about whether to meet the requirements, but the visual observation method is susceptible to the direct impact that the accuracy of the spectral relative power distribution of the used standard light sources has on the color that the surface of the object shows. In addition, due to the impact of observer's emotional, physical and psychological factors, its subjectivity is very strong and the repeatability is very poor. Although the measuring method of the traditional instrument can reduce the impact of human factors as much as possible and give a reliable, objective and repeatable measurement and identification results, the traditional color measuring instrument cannot measure the color of color images, curved surfaces, or rugged, color mixing, coloring uneven or irregular object surfaces due to the restrictions of the principle and the structure of the instrument itself. In this embodiment, the digital camera 10 acquires the image color data by using the digital camera 10 instead of the naked-eye observation, and obtains the XYZ spectral tristimulus value according to the conversion relationship, so as to calculate the related chromaticity parameter. The method of acquiring the image color data by the digital camera 10 can measure the color of color images, curved surfaces, or rugged, color mixing, coloring uneven or irregular object surfaces that the traditional color measuring instrument cannot measure, the using range is wider, and the test result is more reliable.

As an improved specific embodiment, the conversion relationship from the image color data to the XYZ spectral tristimulus value is calculated as follows: obtaining the image color data of N color blocks on the standard color card, obtaining the XYZ spectral tristimulus value of N color cards on the standard color card, establishing a polynomial regression model therebetween, and calculating the conversion matrix therebetween; wherein the polynomial regression model is as follows:

$$\begin{bmatrix} R \\ G \\ B \end{bmatrix} \bullet M = \begin{bmatrix} X \\ Y \\ Z \end{bmatrix}$$

where R is a red light signal, G is a green light signal, B is a blue light signal, X, Y, and Z are the spectral tristimulus values, let the matrix $$\begin{bmatrix} R \\ G \\ B \end{bmatrix} = I, \begin{bmatrix} X \\ Y \\ Z \end{bmatrix} = H,$$

that is, the formula (1) may be expressed as H=IM, M is the matrix coefficient to be solved, the conversion matrix M may be solved by the following formula based on the least square method:

$$M = (I^T I)^{-1} I^T H \quad (2)$$

where $I^T$ represents the transposition of I.

The conversion relationship is obtained by the above formulas using the standard color card as the standard. The XYZ spectral tristimulus value may be obtained according to the conversion relationship after the digital camera 10 obtains the image color data of the standard sample and the batch sample so as to calculate the relevant chromaticity parameters. The color difference is contrasted. It is determined by the computer whether the batch sample meets the requirement. The automatic measurement gives a higher accuracy, a little external interference, and a wider application, and can measure more objects.

As an improved specific embodiment, the digital camera 10 may be arranged in the middle of the upper part of the color matching observation box or at the opening on the side surface of the upper part of the color matching observation box; when the digital camera 10 is arranged in the middle of the upper part of the color matching observation box, the measured object is placed directly on the bottom plate 9 of the color matching observation box; when the digital camera 10 is arranged at the opening on the side surface of the upper part of the color matching observation box, the digital camera 10 and the bottom plate 9 form an included angle of 45 degrees, a substrate 8 directly facing the digital camera 10 is arranged on the bottom plate 9, the substrate 8 and the bottom plate 9 form an included angle of 45 degrees, and the measured object is placed on the substrate 8. Depending on the arrangement position of the light source, different methods of arranging the digital camera 10 may be used. When the light source above the color matching observation box is denser, the digital camera 10 may be arranged at the opening on the side surface of the upper part of the color matching observation box, the substrate 8 is arranged at an included angle of 45 degrees so that the substrate 8 collects the image color data directly facing the digital camera 10, the light source in the upper part is projected onto the measured objects on the substrate 8 at an angle of 45 degrees, and the light source is subjected to less interference so as to facilitate testers to observe the situation in the color matching observation box. When the space is left in the middle of the upper side of the color matching observation box, the digital camera 10 is provided in the middle of the upper part of the color matching observation box as the optimum position. The digital camera 10 directly collects the image color data of the measured object to be placed immediately below it, the light source is directed to the measured object to be placed immediately below it, and the illumination effect is more uniform.

As an improved specific embodiment, the halogen tungsten lamp 1 is one of the light sources, there two groups of halogen tungsten lamps 1 and light filters 2, which are symmetrically arranged at the right and left sides above the color matching observation box. There two groups of narrow-wave LED light sources 3 and UV ultraviolet lamps 7, which are arranged to be matched with two groups of halogen tungsten lamps 1, respectively; the light source further comprises an incandescent lamp 4, a sunset lamp 5 and a fluorescent lamp 6; a variety of light sources are symmetrically arranged above the color matching observation box; and the incandescent lamp 4, the sunset lamp 5 and the fluorescent lamp 6 work alone for color measurement. The left and right groups of halogen tungsten lamps 1 and narrow-wave LED light sources 3 are arranged to for cooperation so that the light ray of the whole color matching observation box is more uniform, overcoming the shortcoming that the light ray is strong in the middle and weak at both sides for the traditional middle single light source arrangement; a plurality of standard light sources are arranged, that is, an incandescent lamp 4, a sunset lamp 5 and a fluorescent lamp 6, which may demarcate the illumination uniformity and relative color value under a plurality of standard light sources, facilitating the adjustment of the color matching observation box, and improving the accuracy of the color measurement of the measured object.

What is claimed is:

1. A method for performing color measurement using a standard light source color matching observation box, wherein a halogen tungsten lamp and a light filter are arranged in the color matching observation box for cooperation, the light ray of the halogen tungsten lamp emits a main body radiation light ray through the light filter; a plurality of narrow-wave LED light sources of different light-emitting wavelengths are arranged to emit a compensation light ray; the main body radiation light ray and the compensation light ray are mixed in the color matching observation box into a mixed light ray that uniformly simulates a standard D illuminant; and the mixed light ray is used to perform a color measurement on a object to be measured in the color matching observation box;

wherein the color matching observation box adjusts the brightness of the narrow-wave LED light sources of different light-emitting wavelengths by measuring a change in color temperature data during the color measurement, so that the color temperature data of the mixed light ray meets a requirement according to the quality of the measured object; and wherein the color matching observation box is calibrated before leaving a factory by the following steps:

[1] measuring a spectral power distribution curve of the main body radiation light ray by an externally connected spectrum analyzer;

[2] comparing the spectral power distribution curve measured in [1] with the relative spectral power distribution curve of a CIE standard D illuminant, and initially adjusting the brightness of each narrow-wave LED light source;

[3] measuring the color temperature data and the metamerism index data of the mixed light ray by an externally connected spectrum analyzer;

[4] determining whether the color temperature data and the metamerism index data measured in [3] meet the requirement;

[5] finely adjusting the brightness of each narrow-wave LED light source and repeating steps [3], [4], and [5] when the color temperature data or the metamerism index data does not meet the requirement; and completing the calibration and saving the calibration data when the color temperature data and the metamerism index data meet the requirement at the same time.

2. The method for performing color measurement using a standard light source color matching observation box according to claim 1, wherein when the tungsten halogen tungsten lamp and the narrow-wave LED light source are in operation, the tungsten halogen tungsten lamp is an illumination main body which provides main illumination energy, and the illumination energy of the narrow-wave LED light source occupies 20% or less of the total radiation energy.

3. The method for performing color measurement using a standard light source color matching observation box according to claim 2, wherein a UV ultraviolet lamp is arranged in the color matching observation box, which compensates for UV energy when working together with the halogen tungsten lamp and the narrow-wave LED light source.

4. The method for performing color measurement using a standard light source color matching observation box according to claim 1, wherein the color matching observation box is calibrated before leaving the factory: that is, sampling the color temperature data by the externally connected spectrum analyzer, sampling the RGB data by a color sensor arranged in the color matching observation box, calculating a matrix coefficient between the RGB data and the color temperature data, and sending the matrix coefficient to a main control module of the color matching observation box to be saved; and obtaining the color temperature data by calculating the RGB data and the matrix coefficient sampled by the color sensor after the color matching observation box leaves the factory.

5. The method for performing color measurement using a standard light source color matching observation box according to claim 4, wherein the RGB is converted to XYZ by a polynomial regression algorithm with the formula:

$$\begin{bmatrix} R \\ G \\ B \end{bmatrix} \bullet M = \begin{bmatrix} X \\ Y \\ Z \end{bmatrix} \quad (1)$$

where R is a red light signal, G is a green light signal, B is a blue light signal, X, Y, and Z are the spectral tristimulus values, let the matrix $$\begin{bmatrix} R \\ G \\ B \end{bmatrix} = I, \begin{bmatrix} X \\ Y \\ Z \end{bmatrix} = H,$$

that is, the formula (1) may be expressed as H=IM, M is the matrix coefficient to be solved, the conversion matrix M may be solved by the following formula based on the least square method:

$$M=(I^T I)^{-1} I^T H \quad (2)$$

where $I^T$ represents the transposition of I;

the XYZ converting color temperature is calculated by the following formulas:

$$CCT=449V^3+3525V^2+6823.3V+5520.33 \quad (3)$$

$$V=(x-0.3320)/(0.1858-y) \quad (4)$$

$$x=X/(X+Y+Z) \quad (5)$$

$$y=Y/(X+Y+Z) \quad (6)$$

where CCT is the color temperature, and V, x, and y are intermediate variables.

6. The method for performing color measurement using a standard light source color matching observation box according to claim 1, wherein the color collection is performed by arranging a light source above the color matching observation box to be matched with an upper digital camera;

the image color data of a standard color card under the light source in the color matching observation box is collected through the digital camera, the image color data is combined with the XYZ spectral tristimulus value of the standard color card to obtain a conversion relationship there between; and the image color data of a standard sample and a batch sample under the light source in the color matching observation box is measured using the digital camera, the XYZ spectral tristimulus value of the standard sample and the batch sample is calculated by the conversion relationship obtained by the standard color card, the relevant chromatic aberration is calculated based on the XYZ spectral tristimulus value thereof, and it is determined whether the color meets the requirement.

7. The method for performing color measurement using a standard light source color matching observation box according to claim 6, wherein the conversion relationship from the image color data to the XYZ spectral tristimulus value is calculated as follows:

obtaining the image color data of N color blocks on the standard color card, obtaining the XYZ spectral tristimulus value of N color cards on the standard color card, establishing a polynomial regression model therebetween, and calculating the conversion matrix therebetween; wherein the polynomial regression model is as follows:

$$\begin{bmatrix} R \\ G \\ B \end{bmatrix} \bullet M = \begin{bmatrix} X \\ Y \\ Z \end{bmatrix}$$

where R is a red light signal, G is a green light signal, B is a blue light signal, X, Y, and Z are the spectral tristimulus values, let the matrix $$\begin{bmatrix} R \\ G \\ B \end{bmatrix} = I, \begin{bmatrix} X \\ Y \\ Z \end{bmatrix} = H,$$

that is, the formula (1) may be expressed as H=IM, M is the matrix coefficient to be solved, the conversion matrix M may be solved by the following formula based on the least square method:

$$M = (I^T I)^{-1} I^T H \qquad (2)$$

where $I^T$ represents the transposition of I.

8. The method for performing color measurement using a standard light source color matching observation box according to claim 7, wherein the digital camera may be arranged in the middle of the upper part of the color matching observation box or at the opening on the side surface of the upper part of the color matching observation box; when the digital camera is arranged in the middle of the upper part of the color matching observation box, the measured object is placed directly on the bottom plate of the color matching observation box; when the digital camera is arranged at the opening on the side surface of the upper part of the color matching observation box, the digital camera and the bottom plate form an included angle of 45 degrees, a substrate directly facing the digital camera is arranged on the bottom plate, the substrate and the bottom plate form an included angle of 45 degrees, and the measured object is placed on the substrate.

\* \* \* \* \*